(12) United States Patent
Shirakawa et al.

(10) Patent No.: US 7,509,282 B2
(45) Date of Patent: Mar. 24, 2009

(54) AUCTION SYSTEM AND METHOD

(75) Inventors: Hiroshi Shirakawa, Urayasu (JP); Takeichiro Nishikawa, Yokohama (JP); Naoshi Uchihira, Kawasaki (JP); Keiji Ohmori, Yokohama (JP); Makoto Miyoshi, Ichikawa (JP); Satoru Endo, Machida (JP); Yoshikuni Matsumura, Kawasaki (JP)

(73) Assignees: Kabushiki Kaisha Toshiba, Kawasaki-shi (JP); The Sanwa Bank Limited, Osaka-shi (JP); Financial Technology Research Institute, Inc., Tokyo (JP)

( * ) Notice: Subject to any disclaimer, the term of this patent is extended or adjusted under 35 U.S.C. 154(b) by 1875 days.

(21) Appl. No.: 09/773,913

(22) Filed: Feb. 2, 2001

(65) Prior Publication Data
US 2001/0020233 A1    Sep. 6, 2001

(30) Foreign Application Priority Data
Feb. 4, 2000    (JP)    ............................. 2000-028108

(51) Int. Cl.
*G06Q 40/00* (2006.01)
(52) U.S. Cl. .......................................... 705/37; 705/38
(58) Field of Classification Search .................... 705/35, 705/37–38
See application file for complete search history.

(56) References Cited

U.S. PATENT DOCUMENTS

| | | | | | |
|---|---|---|---|---|---|
| 5,742,775 | A | * | 4/1998 | King ............................ | 705/38 |
| 5,966,699 | A | * | 10/1999 | Zandi ........................... | 705/38 |
| 6,023,686 | A | | 2/2000 | Brown | |
| 6,098,051 | A | | 8/2000 | Lupien et al. | |
| 2002/0116312 | A1 | * | 8/2002 | Talbot et al. ................... | 705/37 |
| 2002/0120557 | A1 | * | 8/2002 | Chien ............................ | 705/38 |
| 2004/0205019 | A1 | * | 10/2004 | Painter et al. ................. | 705/38 |

FOREIGN PATENT DOCUMENTS

| | | |
|---|---|---|
| JP | 10-222581 | 8/1998 |
| WO | WO 98/10361 | 3/1998 |

OTHER PUBLICATIONS

Ho Geun Lee, "Electronic brokerage and electronic auction: the impact of IT on market structures," System Sciences, 1996., Proceedings of the Twenty-Ninth Hawaii International Conference on vol. 4, Jan. 3-6, 1996 pp. 397-406 vol. 4 .*

(Continued)

*Primary Examiner*—Thu Thao Havan
(74) *Attorney, Agent, or Firm*—Oblon, Spivak, McClelland, Maier & Neustadt, P.C.

(57) ABSTRACT

A host apparatus of a financial auction system is disposed in a site that is accessible from user terminal apparatuses through the transmission line of a network. The host apparatus has a borrowing agent serving as the window for a potential borrower, a lending agent serving as the window for a potential lender, a screening section for extracting a potential lending offer matching a predetermined condition, a matchmaking section for selecting a successful bid from potential lending offers, and an information collection section for collecting background information of a potential borrowing request. A database is attached to the host apparatus, where a borrowing request file, lending offer file, and background information file are formed.

6 Claims, 15 Drawing Sheets

OTHER PUBLICATIONS van Heck, E.; van Damme, E.; Kleijnen, J.; Ribbers, P., "New entrants and the role of information technology case-study: the Tele Flower Auction in the Netherlands," System Sciences, 1997, Proceedings of the Thirtieth Hawaii International Conference on vol. 3, Jan. 7-10, 1997 pp. 228-237 vol. 3.*

Richter, C.W., Jr.; Sheble, G.B.; Ashlock, D., "Comprehensive bidding strategies with genetic programming/finite state automata," Power Systems, IEEE Transactions on vol. 14, Issue 4, Nov. 1999 pp. 1207-1212.*

Eiji Takahashi, et al., "Band Assignment System by Auction" IEICE, Communication Society Conference Seminar Articles 2, Society Preprints, The Institute of Electronics, Information and Communication and Engineers, Aug. 16, 1999, 3 pages.

* cited by examiner

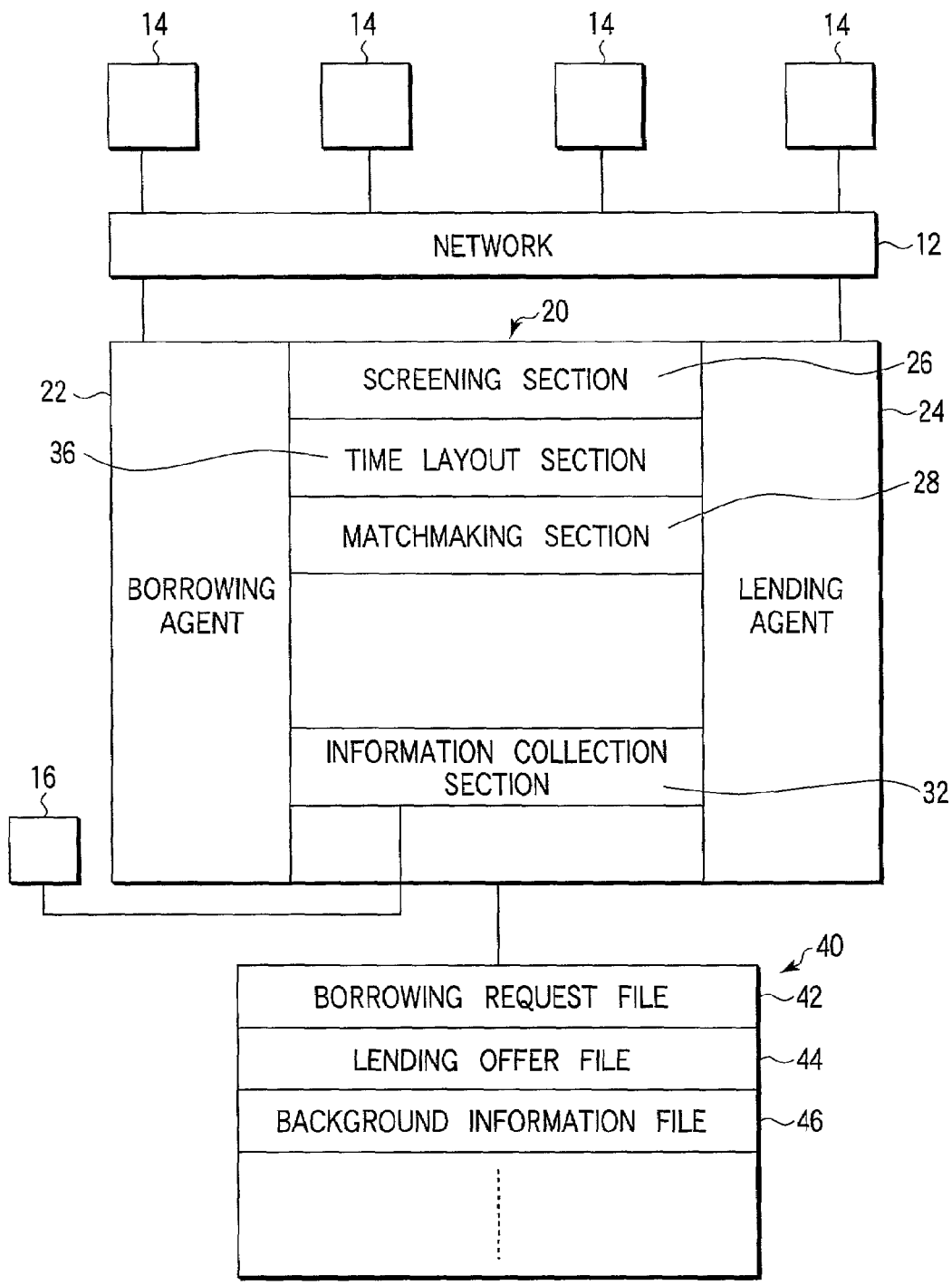
F I G. 1

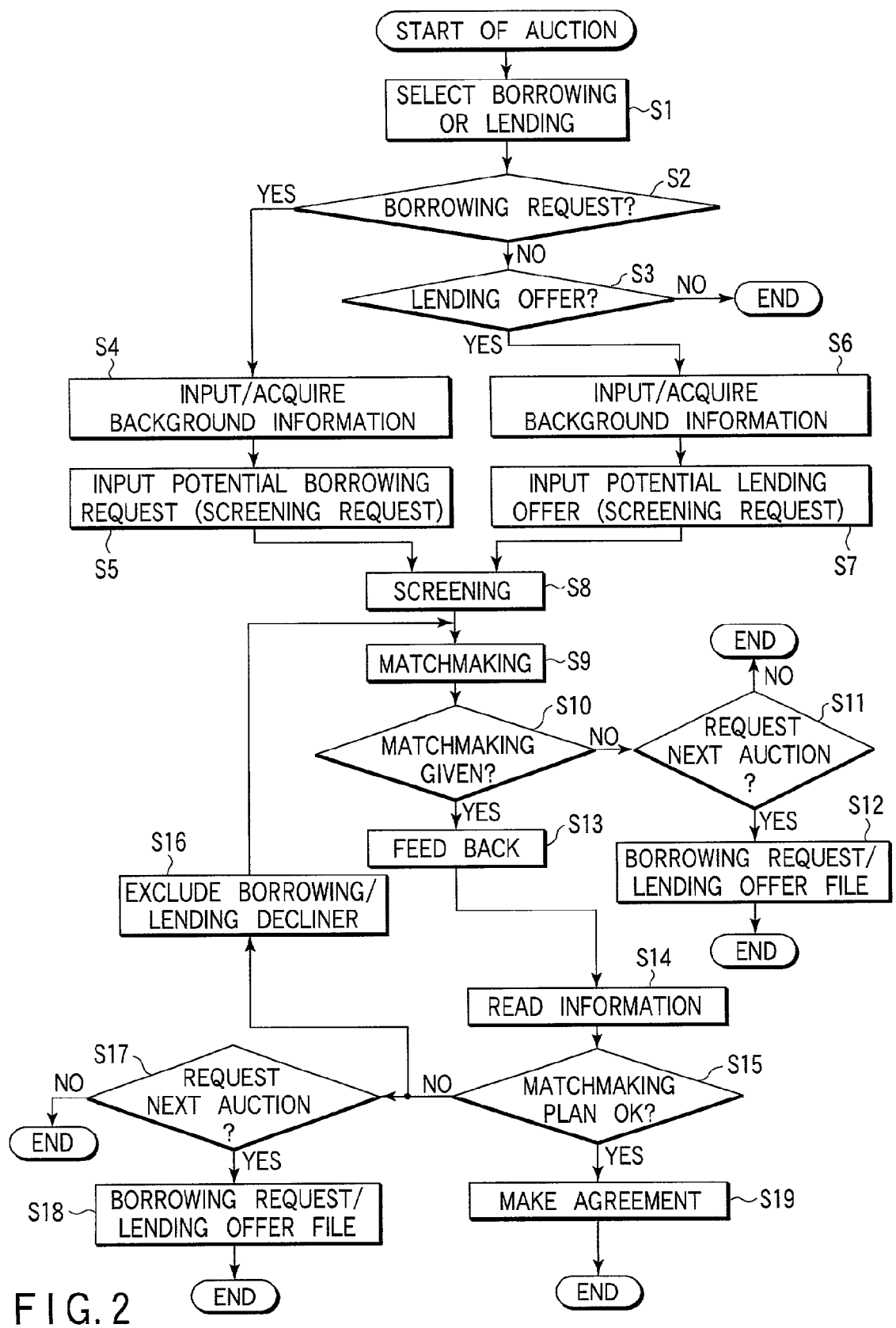
F I G. 2

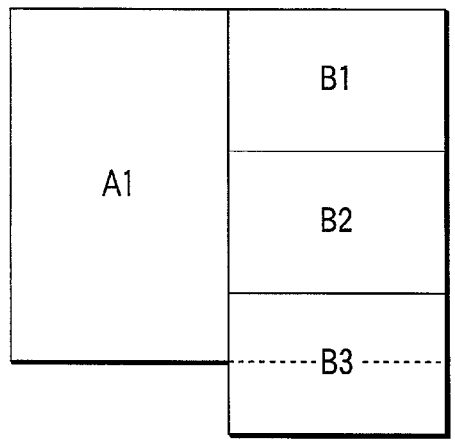
F I G. 3
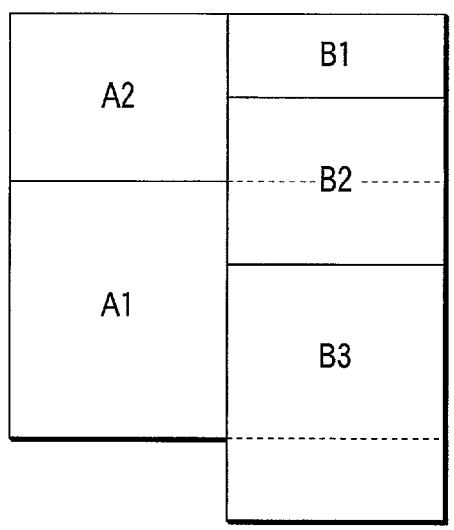
F I G. 4

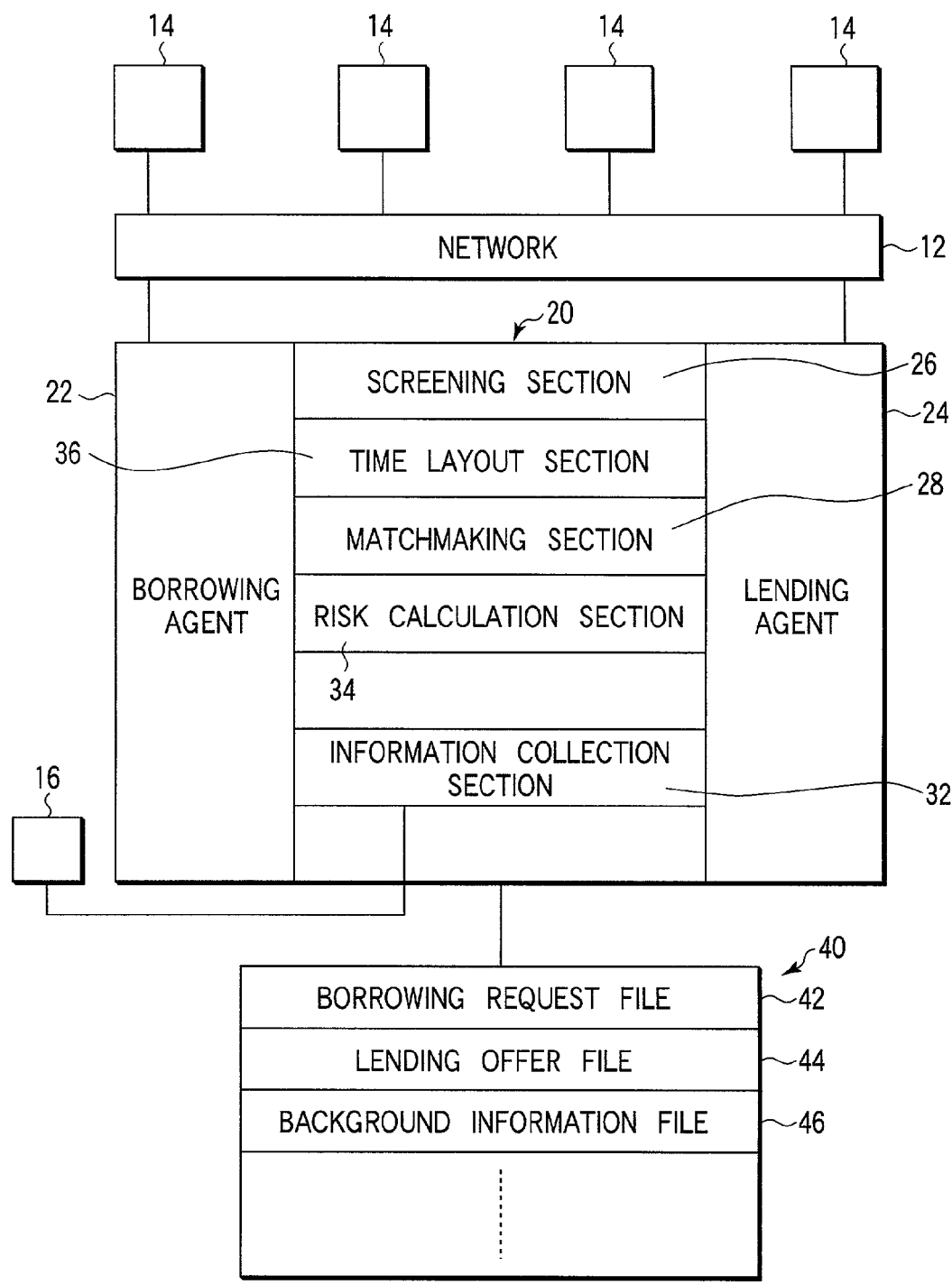
F I G. 5

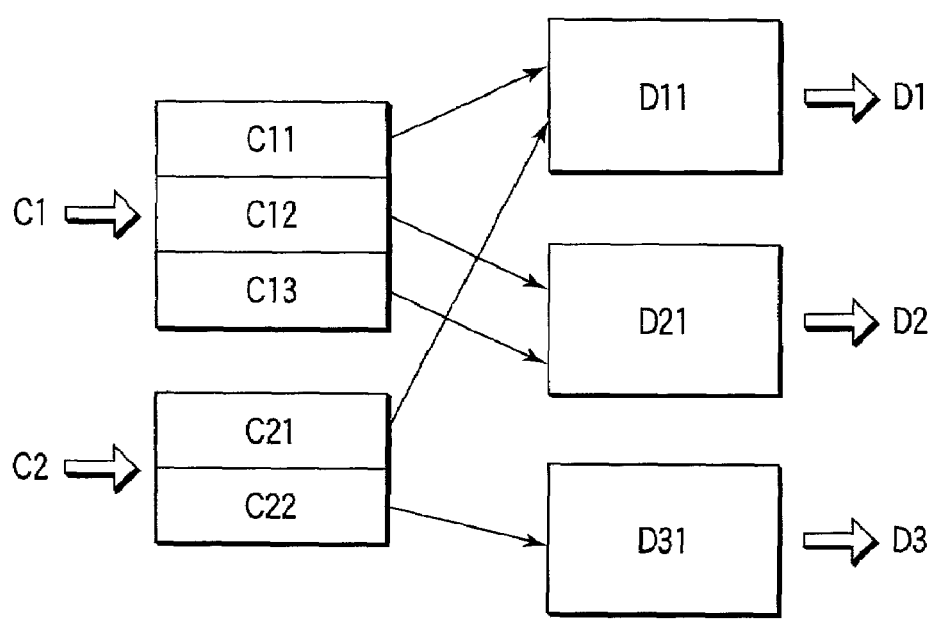
F I G. 8

CYBER FINANCING SYSTEM
APPLICATION FOR MEMBERSHIP

INPUT INFORMATION AND CLICK APPLICATION BUTTON

NAME OF COMPANY: AOI ELECTRIC

ADDRESS: 1-1-1, CHUO-KU, TOKYO

NAME OF PRESIDENT: IEYASU MATSUDAIRA

NAME OF PERSON IN CHARGE: HIKOZAEMON OKUBO

TELEPHONE NUMBER: 03-123-4567

NUMBER OF EMPLOYEES: 10,000

INDUSTRIAL CLASSIFICATION: COMPUTER

APPLICATION     CANCEL

F I G. 12

ACCOUNTING INFORMATION OF AOI ELECTRIC, 1999

DO YOU SEND THE FOLLOWING ACCOUNTING INFORMATION TO THE CYBER FINANCING SYSTEM?

BALANCE SHEET

ASSETS SECTION  LIABILITIES SECTION
CURRENT ASSETS  CURRENT LIABILITIES
FIXED ASSETS    FIXED LIABILITIES
                STOCKHOLDERS' EQUITY SECTION
                CAPITAL STOCK
                LEGAL SURPLUS
                OTHER SURPLUS
TOTAL ASSETS    TOTAL LIABILITIES AND STOCKHOLDERS' EQUITY

INCOME STATEMENT

ORDINARY INCOME SECTION
OPERATING REVENUES AND EXPENSES
  SALES
  COST OF SALES
  SELLING AND GENERAL ADMINISTRATIVE EXPENSES
  OPERATING INCOME
NON-OPERATING REVENUES AND EXPENSES
ORDINARY INCOME

[ TRANSMIT ]   [ CANCEL ]

F I G. 13

CYBER FINANCING SYSTEM
APPLICATION FOR BORROWING REQUEST

INPUT INFORMATION AND CLICK APPLICATION BUTTON

MEMBERSHIP NUMBER: 1234567

PASSWORD: * * * * *

NAME OF COMPANY: AOI ELECTRIC

BORROWING AMOUNT: ¥10,000,000

BORROWING MATURITY: 2000/4/1-2001/3/31

MAXIMUM ALLOWABLE INTEREST: 3.5%

PURPOSE: RESEARCH AND DEVELOPMENT

[APPLICATION]   [CANCEL]

F I G. 14

CYBER FINANCING SYSTEM
CONFIRMATION OF AGREEMENT

MATCHING IS ESTABLISHED. DO YOU MAKE AGREEMENT?

MEMBERSHIP NUMBER: 1234567
NAME OF COMPANY: AOI ELECTRIC
BORROWING AMOUNT: ¥10,000,000
BORROWING MATURITY: 2000/4/1-2001/3/31
INTEREST RATE: 3.1%

AGREEMENT                CANCEL

F I G. 15

CYBER FINANCING SYSTEM
CONFIRMATION OF AGREEMENT

MATCHING IS GIVEN. DO YOU MAKE AGREEMENT?

| | | | | |
|---|---|---|---|---|
| DETAILS | AOI ELECTRIC | ¥3,000,000 | 2000/4/1-2001/3/31 | 3.1% |
| DETAILS | TACHIBANA MACHINERY | ¥1,000,000 | 2000/4/1-2000/9/31 | 3.2% |
| DETAILS | TSUBAKI PHARMACEUTICAL | ¥300,000 | 2000/4/1-2001/3/31 | 3.0% |
| DETAILS | MOMO MILK PRODUCT | ¥200,000 | 2000/6/1-2001/3/31 | 4.0% |
| DETAILS | KAKI SHOKAI | ¥1,000,000 | 2000/8/1-2001/3/31 | 1.2% |
| DETAILS | RINGO BANK | ¥200,000 | 2000/2/1-2001/3/31 | 9.8% |

AGREEMENT      CANCEL

F I G. 16

AUCTION SYSTEM AND METHOD

CROSS-REFERENCE TO RELATED APPLICATIONS

This application is based upon and claims the benefit of priority from the prior Japanese Patent Application No. 2000-028108, filed Feb. 4, 2000, the entire contents of which are incorporated herein by reference.

BACKGROUND OF THE INVENTION

The present invention relates to an auction system for making match between a person who wants to obtain a loan, i.e., a potential borrower, and a person who wants to finance a loan, i.e., a potential lender through a network, and a method therefor.

Normally, a company which wants to obtain a loan requests it to a specialized financier such as a bank or a nonbank financial organization. However, as is represented by the problem of credit crunch for small and medium companies, the current financing method in Japan has several problems as will be described below.

First, in association with credit limit decision (decision of risk that a company bankrupts to be unable to repay), there is a large time lag between the financing requiring time and the actual financing time. In addition, the fund supply route for risky financing has multiple stages, and the distribution cost therein makes the risk premium too larger. Furthermore, since the indirect financing system is employed, individual assets that are supposed to be able to bear the risk cannot select the borrower, so the acceptable risk of the assets is limited.

For these reasons, even a superior company eligible for a loan at an interest lower than the market average must pay a high interest or cannot be financed in some cases. In addition, an unsecured loan from a nonbank financial organization requires a higher interest payment. As described above, companies in Japan must pay unnecessarily high interests, and this probably impedes development of domestic industries.

BRIEF SUMMARY OF THE INVENTION

The present invention has been made in consideration of the above conventional problems, and has as its object to provide a new auction system for directly connecting a person who wants to obtain a loan and a person who wants to finance a loan, and a method therefor.

According to a first aspect of the present invention, there is provided an auction system comprising:

a section configured to input a plurality of potential borrowing requests each including a desired borrowing amount and a maximum allowable interest;

a section configured to input a plurality of potential lending offers each including a desired lending amount and a desired lending interest; and a section configured to perform matching between the potential borrowing requests and the potential lending offers on the basis of the respective maximum allowable interests and desired lending interests and to make the desired lending amount of a potential lending offer extracted as a result of matching correspond to the desired borrowing amount of a potential borrowing request extracted as a result of matching.

According to a second aspect of the present invention, there is provided an auction system comprising:

a borrowing intermediacy section configured to receive a potential borrowing request including a desired borrowing amount and a maximum allowable interest;

a borrowing request storage section configured to register the potential borrowing request;

a lending intermediacy section configured to receive a plurality of potential lending offers each including a desired lending amount and a desired interest or a rule capable of calculating the desired interest;

a lending offer storage section configured to register the potential lending offers; and a matchmaking section configured to select a set of successful bids in ascending order of the desired interests from the potential lending offers within a range not more than the maximum allowable interest until the desired borrowing amount is satisfied.

According to a third aspect of the present invention, there is provided an auction method comprising the steps of:

inputting a plurality of potential borrowing requests each including a desired borrowing amount and a maximum allowable interest;

inputting a plurality of potential lending offers each including a desired lending amount and a desired lending interest; and performing matching between the potential borrowing requests and the potential lending offers on the basis of the respective maximum allowable interests and desired lending interests and making the desired lending amount of a potential lending offer extracted as a result of matching correspond to the desired borrowing amount of a potential borrowing request extracted as a result of matching.

According to a fourth aspect of the present invention, there is provided an auction method comprising the steps of:

receiving a potential borrowing request including a desired borrowing amount and a maximum allowable interest;

registering the potential borrowing request;

receiving a plurality of potential lending offers each including a desired lending amount and a desired interest;

registering the potential lending offers;

extracting a potential lending offer for which the desired interest is not more than the maximum allowable interest from the potential lending offers; and selecting a set of successful bids in ascending order of the desired interests from the extracted potential lending offers until the desired borrowing amount is satisfied.

According to the present invention, a new auction system for directly connecting a person who wants to obtain a loan and a person who offers financing/investment, and a method therefor can be provided.

BRIEF DESCRIPTION OF THE SEVERAL VIEWS OF THE DRAWING

FIG. 1 is a block diagram showing a financial auction system according to an embodiment of the present invention;

FIG. 2 is a flow chart showing the process of a financial auction using the system shown in FIG. 1;

FIG. 3 is a view showing the concept of matchmaking based on one potential borrowing request and three potential lending offers;

FIG. 4 is a view showing the concept of matchmaking based on two potential borrowing requests and three potential lending offers;

FIG. 5 is a block diagram showing a financial auction system according to another embodiment of the present invention;

FIG. 8 is a view showing the concept of joint repayment by two borrowers and three lenders;

FIG. 12 is a view showing an interface for membership application;

FIG. 13 is a view showing an interface for inputting accounting information;

FIG. 14 is a view showing an interface for borrowing application;

FIG. 15 is a view showing an interface for confirming an agreement; and

FIG. 16 is a view showing an interface for confirming an agreement.

DETAILED DESCRIPTION OF THE INVENTION

Figure 6:
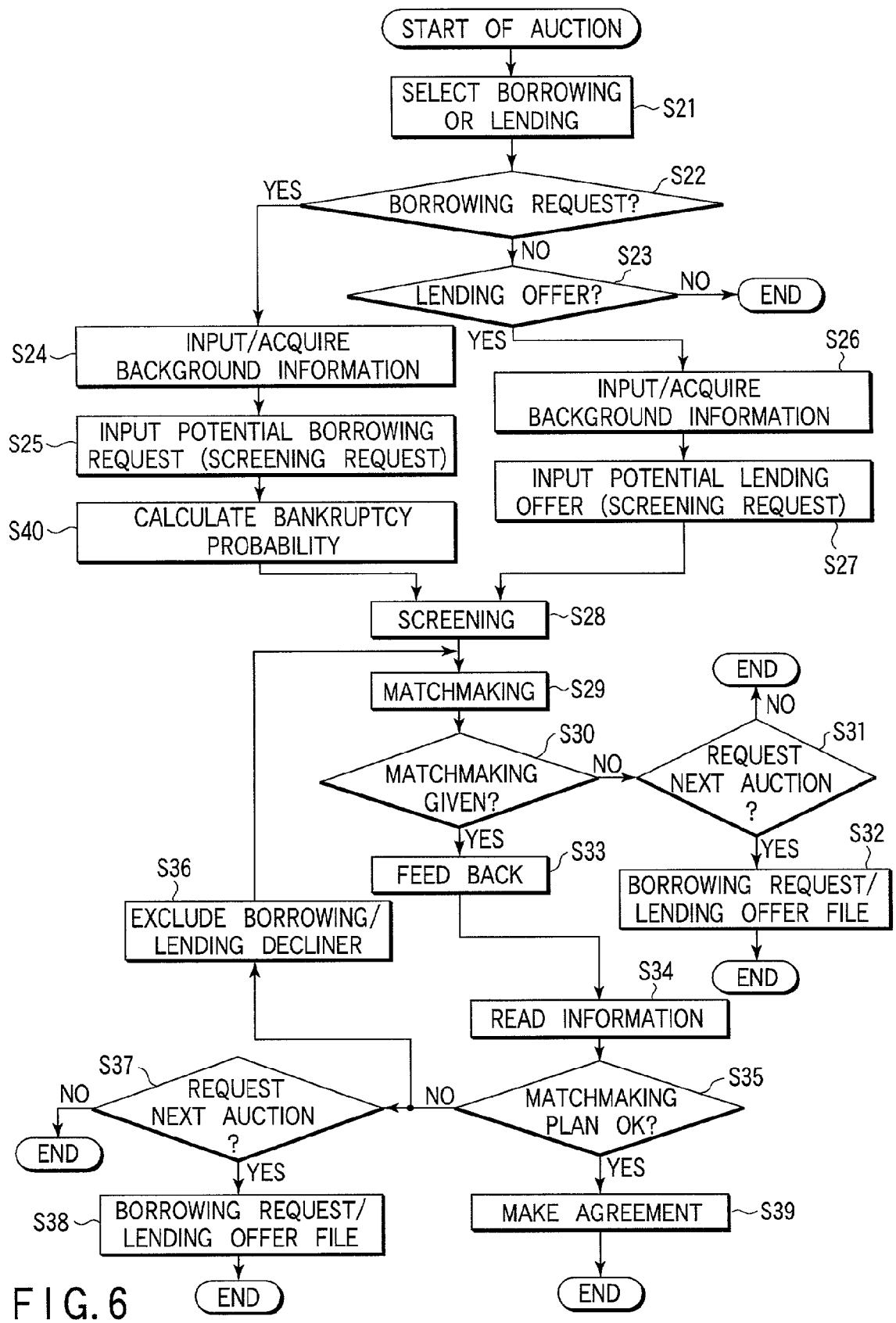
FIG. 6 is a flow chart showing the process of a financial auction using the system shown in FIG. 5.

The embodiments of the present invention will be described below with reference to the accompanying drawing. The same reference numerals denote components having almost the same functions and arrangements in the following description, and a description will be repeated only if it is necessary.

First Embodiment

FIG. 1 is a block diagram showing a financial auction system according to an embodiment of the present invention.

In this embodiment, a host apparatus 20 of the financial auction system is disposed in a site that is accessible from user terminal apparatuses 14 such as personal computers through the transmission line of a network 12 and, more particularly, the Internet (public communication line network). The host apparatus 20, i.e., the host computer (web server, application server, and database server) has a borrowing agent 22 (borrowing intermediacy means) serving as the window for a person (potential borrower) who presents a potential borrowing request, and a lending agent (lending intermediacy means) 24 serving as the window for a person (potential lender) who presents a potential lending offer. The host apparatus 20 also has a screening section 26 (screening means) for extracting a potential lending offer or potential borrowing request matching a predetermined condition, a matchmaking section 28 (matchmaking means) for selecting a successful bid from potential lending offers, and an information collection section 32 for collecting background information of a potential borrowing request.

A database 40 is attached to the host apparatus 20. The database 40 has a borrowing request file 42, lending offer file 44, and background information file 46. The borrowing request file 42, lending offer file 44, and background information file 46 store potential borrowing requests, potential lending offers, and background information of potential borrowing requests, respectively. This system configuration is merely an example, and a system which is the same in terms of concept can also be realized by distributed processing of a plurality of computers.

FIG. 2 is a flow chart showing the process of a financial auction using the system shown in FIG. 1. This will be described below with reference to FIG. 2.

Figure 11:
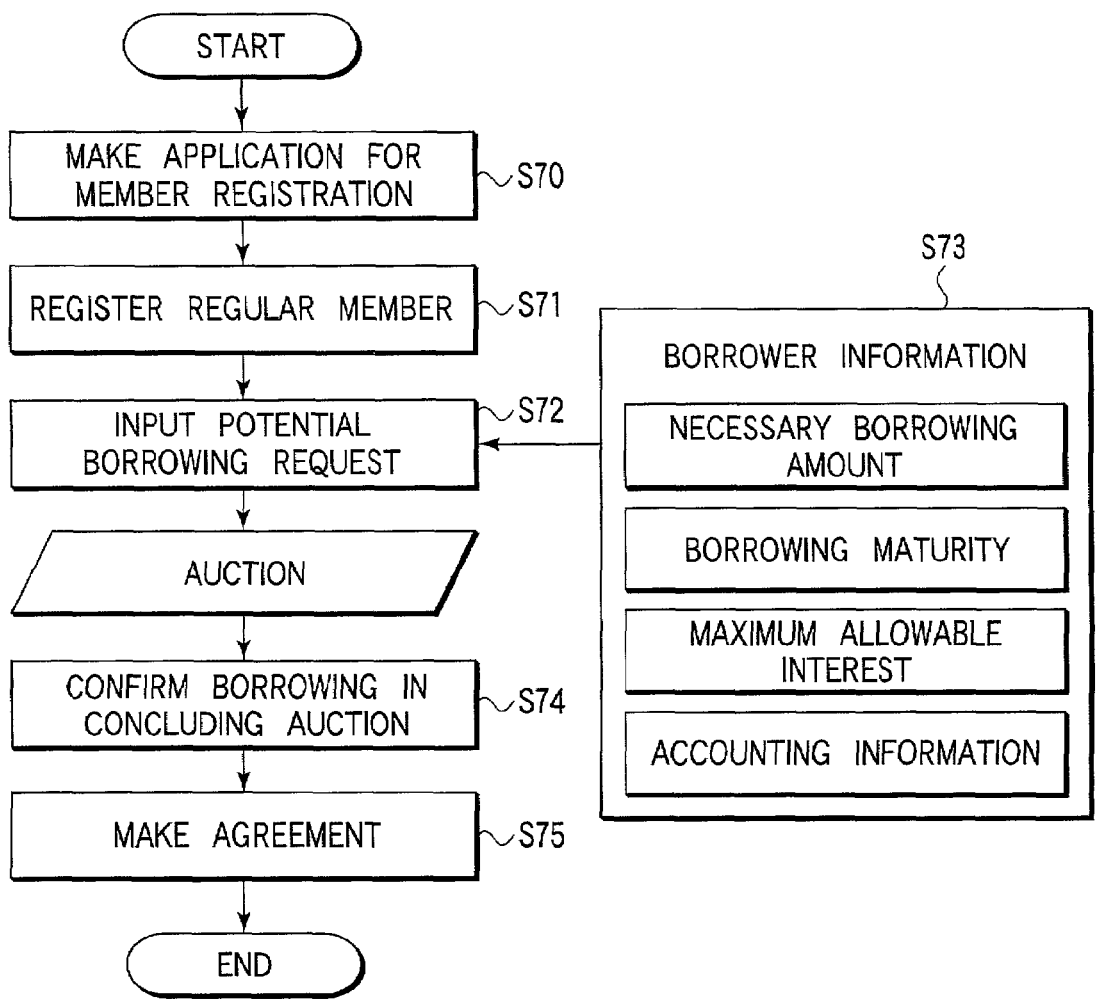
FIG. 11 is a flow chart showing the process from member registration of a user to an agreement.

For a user (potential borrower or potential lender) who has accessed the host apparatus 20 from the user terminal apparatus 14, the process advances from member registration of the user to an agreement as indicated by the outline (flow chart) shown in FIG. 11. After "member registration application" (S70), the user is registered as a regular member (S71). FIG. 12 is a view showing an interface for membership application. The potential borrower inputs information related to the borrowing request (to be described later) (S72 and S73) and enters an auction. After the auction has been concluded, the lender is confirmed (S74), and the agreement is made (actual agreement) (S75). This will be described in detail.

The user who has ended user registration selects a borrowing request or lending offer in FIG. 2 (S1). If the user is a potential borrower (S2), pieces of information related to the borrowing request are input from the terminal apparatus 14 to the borrowing agent 22. First, the potential borrower is obligated to input pieces of background information (primary information) to the borrowing agent 22 (S4) (FIG. 13). These pieces of background information include information of accounting, profile, and the like of the potential borrower (entity of the request). These pieces of information are written in the background information file 46 through the information collection section 32. On the other hand, pieces of background information (secondary information) of the potential borrower are acquired/collected through an external agency 16 such as a credit investigation company or rating organization (S4) and written in the background information file 46 through the information collection section 32. Next, the potential borrower inputs pieces of information such as the desired borrowing amount and maximum allowable interest (FIG. 14) related to the potential borrowing request and a request about screening (to be described below in detail) (S5). These pieces of information are written in the borrowing request file 42.

On the other hand, if the user is a potential lender (S3), pieces of information related to the lending offer are input from the terminal apparatus 14 to the lending agent 24. As in the above-described case, the potential lender inputs pieces of background information (primary information) to the lending agent 24 (S6). The pieces of input primary information are written in the background information file 46 through the information collection section 32. On the other hand, pieces of background information (secondary information) of the potential lender are acquired/collected through the external agency 16 such as a credit investigation company or rating organization (S6) and written in the background information file 46 through the information collection section 32. The potential lender inputs the desired lending amount and desired interest related to the potential lending offer and a request about screening (S7). These pieces of information are written in the lending offer file 44.

Either of the potential borrowing request input and potential lending offer input can be done first in setting a predetermined auction.

Next, the screening section 26 and matchmaking section 28 perform screening (S8) and matchmaking (S9) related to the potential borrowing request and potential lending offer. Screening by the screening section 26 will be described first.

Screening is a function of narrowing down the matchmaking targets on the basis of the background information of the potential borrower and potential lender. Screening is done under the composite condition of conditions set by the potential borrower and potential lender to select matchmaking targets. With the condition setting function, the conditions of the potential borrower and potential lender can be designated using the primary information directly input by the potential lender and the secondary information extrapolated or processed by various agencies.

1. Primary Information
   1) Screening by Accounting Information

The potential lender (or potential borrower) selects a potential borrower (or potential lender) by designating the numerical range of accounting information. In addition, the potential lender can select a potential borrower on the basis of a grade representing the degree of confidence of statement of accounts, such as the presence/absence of a continuous audit report.

2) Screening by Profile

The potential lender (or potential borrower) can select a potential borrower (or potential lender) in accordance with attribute information such as nationality, industrial classification, business history, transactions or capital relationship with large companies, and the presence/absence of a successor.

2. Secondary Information
   1) Screening by Rating

The potential lender (or potential borrower) can select a potential borrower (or potential lender) on the basis of the grade of rating extrapolated by a rating organization. In addition, the potential lender can select a potential borrower as a matchmaking target by designating simple rating representing the risk of a portfolio.

2) Screening by Scoring

The potential lender (or potential borrower) can select a potential borrower (or potential lender) by an index defined by each company. For example, selection can be done using an index defined from the viewpoint of, e.g., the degree of confidence, outlook for growth, ecological policy, black information (marked client), regional characteristics, and industrial classification characteristics. As such indices, secondary information formed by processing primary information or an index generated by unique investigation by each company can be extrapolated.

3) Screening by Degree of Confidence of Data Source

The potential lender selects a potential borrower on the basis of a grade representing the degree of confidence of the agency that has input the primary information.

Matchmaking (S9) by the matchmaking section 28 will be described next.

Potential lending offers for which the desired interest is equal to or lower than the maximum allowable interest of the potential borrowing request are extracted from potential lending offers. Until the desired borrowing amount of the potential borrowing request is satisfied, successful bids are selected from the extracted potential lending offers in ascending order of desired interests. A choice for matchmaking is substantially parallelly done for all potential borrowing requests and potential lending offers registered in the borrowing request file 42 and lending offer file 44. However, when a plurality of potential borrowing requests are present, a potential borrowing request whose maximum allowable interest is high is preferentially selected, and a successful bid is sequentially made for potential borrowing requests in descending order of maximum allowable interests.

The above-described rules in matchmaking can be changed as needed. For example, a financial setting interest may be changed in units of potential lending offers or equalized to the highest desired interest. Alternatively, when a plurality of potential borrowing requests are present, a successful bid may be sequentially made for potential borrowing requests in ascending order of maximum allowable interests (The borrowing maturity and lending maturity are not taken into consideration here. Actually, matchmaking is done in consideration of the borrowing maturity and lending maturity. The following example will be described assuming that the borrowing maturity and lending maturity are fixed (e.g., one year)).

If lending interests are different, processing in case of bankruptcy is taken into consideration so that, for example, the collecting priority in case of bankruptcy of the borrower is given in ascending order of interests.

Figure 9:
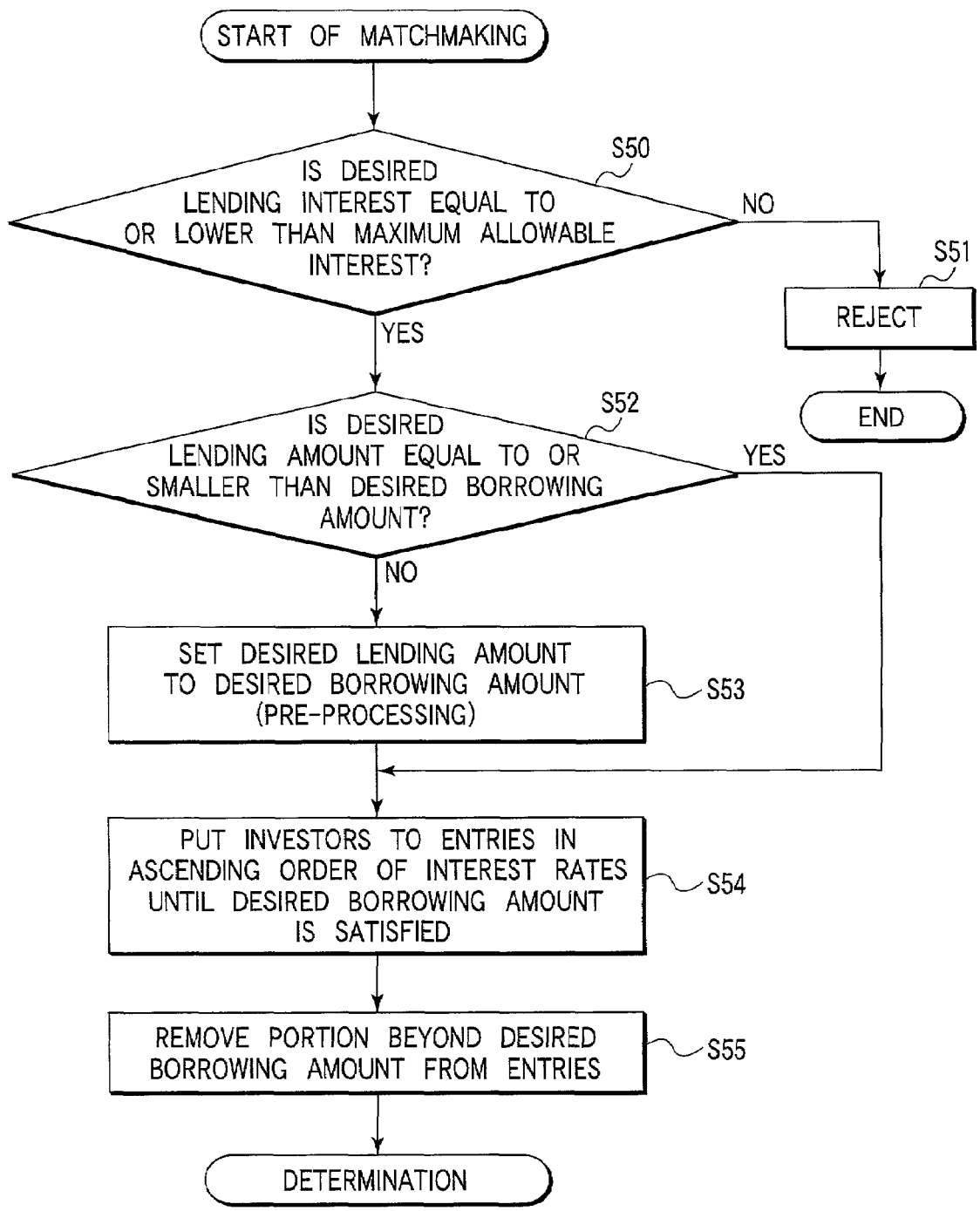
FIG. 9 is a flow chart showing the process of one-to-many matching scheme.

As the first example of the financial auction, a case wherein one potential borrowing request A1 (company A1) and four potential lending offers B1 to B4 (investors B1 to B4) are subjected to matchmaking, as shown in Table 1, will be described in detail with reference to FIG. 9 (one-to-many matching scheme).

TABLE 1

| Potential borrower | Potential lender |
|---|---|
| Company A1 | Investor B1 |
| Desired amount, ¥10,000,000 Interest rate condition, 5% or less | Upper limit of loan, ¥3,000,000 Desired interest 3% |
| | Investor B2 |
| | Upper limit of loan, ¥5,000,000 Desired interest 4% |
| | Investor B3 |
| | Upper limit of loan, ¥5,000,000 Desired interest 5% |
| | Investor B4 |
| | Upper limit of loan, ¥7,000,000 Desired interest 6% |

First, the maximum allowable interest (5% or less) of the company A1 is compared with each of the desired lending interests (3%, 4%, 5%, and 6%) of the potential lenders (S50). The investor B4 falls outside the allowance and is rejected (S51). If the desired borrowing amount is larger than the desired lending amount (S52), the desired lending amounts of the investors B1 to B3 are rewritten to the desired borrowing amount by pre-processing (S53). In this example, pre-processing is unnecessary. Next, the investors are put to the entry sequentially from the upper class (low interest offer) of the offered lending conditions until the amount reaches the desired borrowing amount (S54). A portion beyond the desired borrowing amount (¥3,000,000 of the investor B3) is removed from the entries (S55).

Thus, matching is determined as shown in Table 2. In this example, the potential borrowing request A1 consequently has whole matchmaking with the potential lending offer B1 with the lowest desired interest and the potential lending offer B2 with the medium desired interest. However, the potential borrowing request A1 has only partial matchmaking (¥2,000,000) with the potential lending offer B3 with the highest desired interest (FIG. 3).

TABLE 2

| Potential borrower | Potential lender | Withdrawal order |
|---|---|---|
| Company A1 | Investor B1 | 1 |
| Desired amount, ¥10,000,000 Interest rate condition, 5% or less | Financing amount, ¥3,000,000 Determined interest rate 3% | |
| | Investor B2 | 2 |
| | Financing amount, ¥5,000,000 Determined interest rate 4% | |
| | Investor B3 | 3 |
| | Financing amount, ¥2,000,000 Determined interest rate 5% | |
| | Investor B4 | — |
| | Rejected | |

Since the lending interests of the investors B1 to B3 are different, the withdrawal priority in case of bankruptcy of the borrower is given sequentially from the lowest interest (B1).

When matchmaking is given by the matchmaking section 28 in the above way (S10), the given matchmaking plan is fed back to the borrowing agent 22 and lending agent 24 (S13) and examined by the entity of the potential borrowing request and the entities of the potential lending offers (FIG. 15). In examining the matchmaking plan, the entities of the potential borrowing requests and potential lending offers can read, through the borrowing and lending agents 22 and 24, the pieces of background information of the potential borrowing requests and potential lending offers stored in the background information file 46 (S14). If no matchmaking is given, this reading is not done.

When the matchmaking plan is approved by all of the entities of the potential borrowing requests and potential lending offers (S15), an agreement is made (S19). However, any one of the entities of the potential borrowing requests and potential lending offers does not agree to (declines) the matchmaking plan, the matchmaking section 28 performs matchmaking again (S9) while excluding a predetermined condition (S16). In this example, when the investor B3 declines the matchmaking plan because the predetermined lending amount is not satisfied, matchmaking is done again while excluding the corresponding potential lending offer. As a result, determination is done as shown in Table 3.

TABLE 3

| Potential borrower | Potential lender | Withdrawal order |
|---|---|---|
| Company A1 | Investor B1 | 1 |
| Desired amount, ¥10,000,000 Interest rate condition, 5% or less | Financing amount, ¥3,000,000 Determined interest rate 3% | |
| | Investor B2 | 2 |
| | Financing amount, ¥5,000,000 Determined interest rate 4% | |

TABLE 3-continued

| Potential borrower | Potential lender | Withdrawal order |
|---|---|---|
| | Investor B3 | — |
| | Financing amount, ¥0 Determined interest rate 0% | |
| | Investor B4 | — |
| | Rejection | |

On the other hand, no matchmaking is given by the matchmaking section 28 (S10), the potential borrowers and lenders are asked about participation in the next auction. If an intent to participate is confirmed, registration in the borrowing request file 42 or lending offer file 44 can be maintained (S12). Alternatively, when no matchmaking is given, registration for participation in the next auction may be automatically maintained.

Even when the matchmaking is given by the matchmaking section 28, and the matchmaking plan is declined by the potential borrower or lender (S15), the potential borrower or lender is asked about participation in the next auction, as described above. If an intent to participate is confirmed, registration in the borrowing request file 42 or lending offer file 44 can be maintained (S12). Alternatively, when the matchmaking plan is declined by the potential borrower or lender, registration for participation in the next auction may be automatically maintained, as described above.

Figure 10:
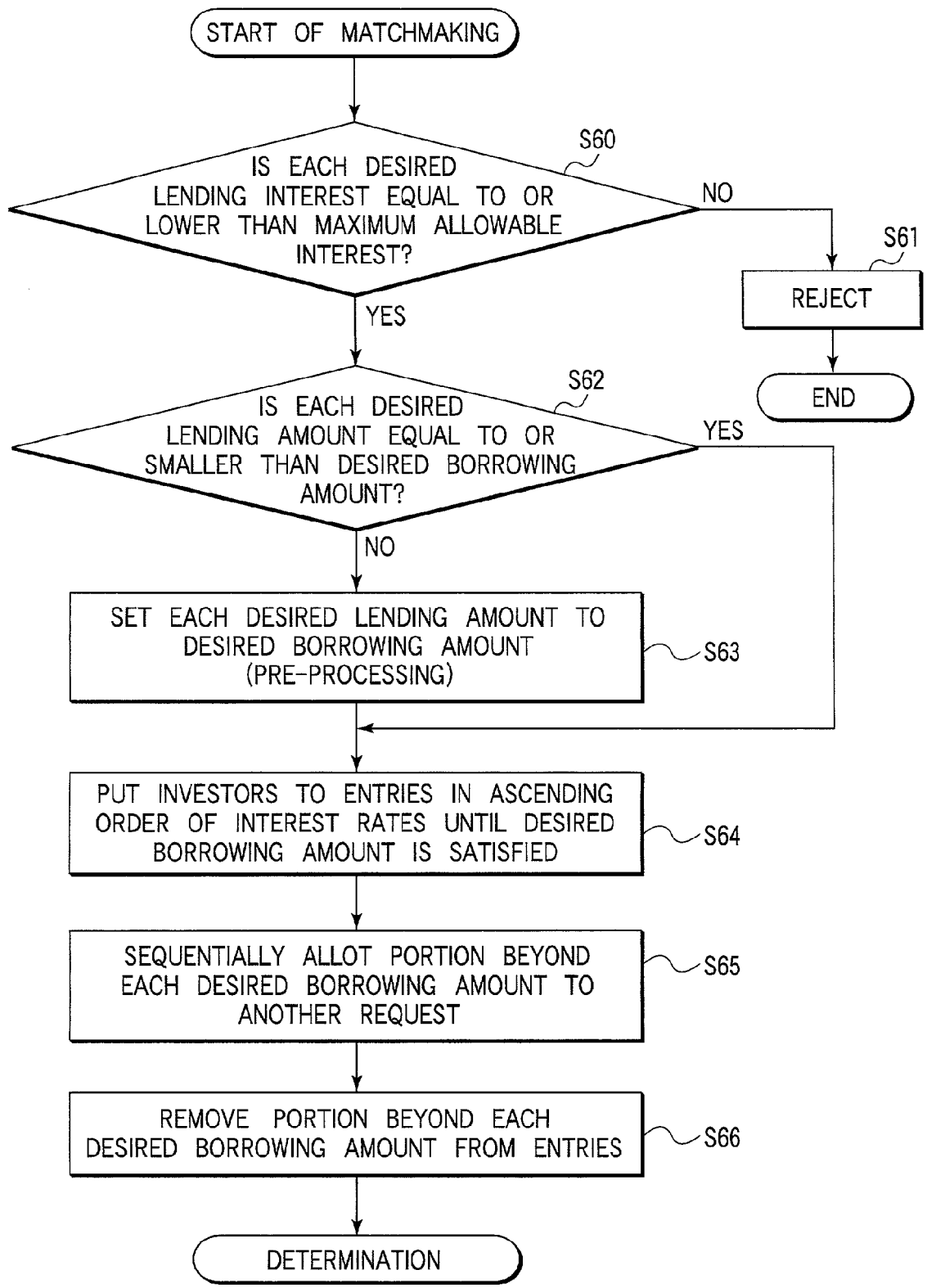
FIG. 10 is a flow chart showing the process of many-to-many matching scheme.

As the second example of the financial auction, a case wherein two potential borrowing requests A1 (company A1) and A2 (company A2) and five potential lending offers B1 to B5 (investors B1 to B5) are subjected to matchmaking, as shown in Table 4, will be described in detail with reference to FIG. 10 (many-to-many matching scheme).

TABLE 4

| Potential borrower | Potential lender |
|---|---|
| Company A1 | Investor B1 |
| Desired amount, ¥8,000,000 Interest rate condition, | Upper limit of load, ¥5,000,000 Desired interest 3% Investor B2 |
| 5% or less Company A2 | Upper limit of loan, ¥8,000,000 |
| Desired amount, ¥10,000,000 | Desired interest 4% Investor B3 |
| Interest rate condition, 6% or less | Upper limit of loan, ¥8,000,000 Desired interest 5% Investor B4 |
| | Upper limit of loan, ¥10,000,000 Desired interest 6% Investor B5 |
| | Upper limit of loan, ¥10,000,000 Desired interest 7% |

First, each of the maximum allowable interests (5% or less and 6% or less) of the companies A1 and A2 is compared with each of the desired lending interests (3%, 4%, 5%, 6%, and 7%) of the potential lenders (S60). For the company A1, the investors B4 and B5 fall outside the range and are rejected (S61). If the desired borrowing amount is larger than the desired lending amount (S62), pre-processing is executed for each company, as described above (S63). In this example, pre-processing is unnecessary. Next, the investors are put to the entries sequentially from the upper class (low interest offer) of the offered lending conditions until the amount reaches the desired borrowing amount (S64). Since there are two potential borrowing requests, the entry priority is given to the company A2 with the higher maximum allowable interest. A portion beyond the desired borrowing amount is allotted to the other company A1 (S65). In this way, when the financing amount exceeds the desired borrowing amount of each company, this portion is removed from the entries.

Thus, matching is determined as shown in Table 5. In this example, the potential borrowing request A2 consequently has whole matchmaking with the potential lending offer B1 with the lowest desired interest and partial matchmaking with the potential lending offer B2 with the medium desired interest. The potential borrowing request A1 has matchmaking with the remaining of the potential lending offer B2 and only partial matchmaking with the potential lending offer B3 with the second lowest desired interest (FIG. 4).

TABLE 5

| Potential borrower | Potential lender | Withdrawal order |
|---|---|---|
| Company A1 | Investor B1 | — |
| Desired amount, ¥8,000,000 Interest rate condition, 5% or less | Financing amount, ¥0 Determined interest rate 0% | |
| | Investor B2 | 3 |
| | Financing amount, ¥3,000,000 Determined interest rate 4% | |
| | Investor B3 | 4 |
| | Financing amount, ¥5,000,000 Determined interest rate 5% | |
| | Investor B4 | — |
| | Rejected | |
| | Investor B5 | — |
| | Rejected | |
| Company A2 | Investor B1 | 1 |
| Desired amount, ¥10,000,000 Interest rate condition, 6% or less | Financing amount, ¥5,000,000 Determined interest rate 3% | |
| | Investor B2 | 2 |
| | Financing amount, ¥5000,000 Determined interest rate 4% | |
| | Investor B3 | — |
| | Financing amount, ¥0 Determined interest rate 0% | |

TABLE 5-continued

| Potential borrower | Potential lender | Withdrawal order |
|---|---|---|
| | Investor B4 | — |
| | Financing amount, ¥0 Determined interest rate 0% | |
| | Investor B5 | — |
| | Rejected | |

Since the lending (determined) interests of the investors B1 to B3 for the companies are different, the collecting priority (preference) in case of bankruptcy of the borrowers is given sequentially from the lowest interest (B1). If the interests equal, the priority is given sequentially from the largest financing amount.

When matchmaking is given by the matchmaking section 28 in the above way (S10), the given matchmaking plan is fed back to the borrowing agent 22 and lending agent 24 (S13) and examined by the entities of the potential borrowing requests and the entities of the potential lending offers (FIG. 16), as in the above-described case. The method of coping with declination and retrying matchmaking is the same as described above and a detailed description thereof will be omitted.

A financial auction is managed in this way.

Second Embodiment

FIG. 5 is a block diagram showing a financial auction system according to another embodiment of the present invention.

This embodiment is different from that shown in FIG. 1 in that a host apparatus 20 of the financial auction system further comprises a risk calculation section (risk calculation means) 34 for calculating the risk of a potential borrowing request from the background information of the potential borrowing request. In this case, a potential lending offer also includes a maximum allowable risk, so a screening section 26 can select a potential lending offer whose maximum allowable risk is equal to or larger than the calculated risk from potential lending offers and send the selected potential lending offer to a matchmaking section 28.

For example, when pieces of accounting information (financial statements or the like in the past several years) of the entity of a potential borrowing request are collected as part of background information, the default rate of the entity of the potential borrowing request can be calculated from the accounting information and used as the above-described risk index. The risk can be calculated using a general calculation rule or calculated on the basis of a calculation condition designated by a potential lender for each potential lending offer. In this case, the know-how of financing of the potential lender can be reflected to the calculation rule.

FIG. 6 is a flow chart showing the process of a financial auction using the system shown in FIG. 5. This will be described below with reference to FIG. 6.

The user who has accessed the host apparatus 20 from a user terminal apparatus 14 selects a borrowing request or lending offer (S21). If the user is a potential borrower (S22), a potential borrowing request is input from the terminal apparatus 14 to a borrowing agent 22. The potential borrower is obligated to input pieces of background information (primary information), including accounting, profile, and the like of the potential borrower (entity of the request) to the borrowing agent 22 (S24). These pieces of pieces of primary information are written in a background information file 46 through an information collection section 32. On the other hand, pieces of background information (secondary information) of the potential borrower are acquired/collected through an external agency 16 such as a credit investigation company or rating organization (S24) and written in the background information file 46 through the information collection section 32. Next, the potential borrower inputs pieces of information such as the desired borrowing amount and maximum allowable interest related to the potential borrowing request and a request about screening (S25). These pieces of information are written in a borrowing request file 42.

On the other hand, if the user is a potential lender (S23), a potential lending offer is input from the terminal apparatus 14 to a lending agent 24. As in the above-described case, the potential lender inputs pieces of background information (primary information) to the lending agent 24. The pieces of input primary information are written in the background information file 46 through the information collection section 32. On the other hand, pieces of background information (secondary information) of the potential lender are acquired/collected through the external agency 16 such as a credit investigation company or rating organization and written in the background information file 46 through the information collection section 32. The potential lender inputs the desired lending amount and desired interest related to the potential lending offer and a request about screening (S25). The request about screening includes the maximum allowable risk and risk calculation condition. These pieces of information are written in a lending offer file 44.

Next, the risk calculation section 34 calculates the default rate and appropriate interest rate for the entity of a potential borrowing request from the accounting information (S40). In calculating the appropriate interest rate, the bankruptcy time of the company is estimated from the accounting information, and an appropriate interest rate is calculated by equations (1) that represent the discount present value per yen:

$$d = \sum_{i=1}^{T^\wedge \tau} \frac{1}{(1+r)^i}(r+\phi) + \frac{1}{(1+r)^T}1_{(\tau<T)} + \frac{1}{(1+r)^\tau}\Omega_{(\tau)}1_{(\tau<T)} \quad (1)$$

$$\Omega_{(\tau)} = \left\{ \frac{1}{FD_\tau}(CA_\tau + FA_\tau + P_{FRA}FRA_\tau + P_{VA}VA_\tau - RRF_\tau) \right\} \wedge 1$$

where r is the discount rate, $\phi$ is the risk premium, T is the maturity of financing, $\tau$ is the default time counted from the financing start time, $\Omega_{(\tau)}$ is the amount that can be collected from the company at the default time, and d on the left-hand side is the discount present value per yen. "T^$\tau$" means that a smaller one of the values T and $\tau$ is selected. In addition, FD is the fixed liability, CA is the surplus cash, FA is the surplus asset, FRA is the tangible fixed asset, VA is the current asset, and RRF is the reserve for retirement allowance.

A detailed method of calculating the appropriate interest is as follows. The value of the default time $\tau$ can change depending on a scenario that represents a change in economical circumstances in the future. For this reason, the bankruptcy time $\tau$ corresponding to each scenario is predicted, the value d is calculated using this value and equations (1), and the expected value of the value d is calculated using the realization probability of each scenario. The risk premium $\phi$ is determined such that the expected value of d matches the d' which is set by the potential lender. And $\gamma+\phi$ can be defined as an appropriate interest rate. In determining the value d', the potential lender can consider the variance of the values d of the scenarios and set the value d' to become larger for larger variance. The scenario need not always be made by an expert such as an economist and may be a scenario that the economical circumstances in the past several years can emerge every year at the same probability. The appropriate interest calculated here changes depending on the financial contents of the company. The potential lender defines the desired interest in units of companies with reference to the appropriate interest. The desired interest and appropriate interest may match.

Next, the screening section 26 and matchmaking section 28 perform screening (S28) and matchmaking (S29) related to the potential borrowing request and potential lending offer.

The screening section 26 performs the above-described screening and also extracts a potential lending offer from the potential lending offers, for which the calculated risk (default rate) of the potential borrowing request falls within the range of the maximum allowable risk.

Matchmaking (S29) by the matchmaking section 28 will be described next.

Potential lending offers for which the desired interest is equal to or lower than the maximum allowable interest of the potential borrowing request are extracted from potential lending offers. Until the desired borrowing amount of the potential borrowing request is satisfied, successful bids are selected from the extracted potential lending offers in ascending order of desired interests. A choice for matchmaking is substantially parallelly done for all potential borrowing requests and potential lending offers registered in the borrowing request file 42 and lending offer file 44.

When matchmaking is given by the matchmaking section 28 in the above way (S30), the given matchmaking plan is fed back to the borrowing agent 22 and lending agent 24 (S33) and examined by the entity of the potential borrowing request and the entity of each potential lending offer. In examining the matchmaking plan, the entities of the potential borrowing requests and potential lending offers can read, through the borrowing and lending agents 22 and 24, the pieces of background information of the potential borrowing requests and potential lending offers stored in the background information file 46 (S34).

When the matchmaking plan is approved by all of the entities of the potential borrowing requests and potential lending offers (S25), an agreement is made (S39). However, any one of the entities of the potential borrowing requests and potential lending offers does not agree to the matchmaking plan, the matchmaking section 28 performs matchmaking again (S29) while excluding a predetermined condition (S36). For example, when the entity of a potential lending offer does not agree to a matchmaking plan, matchmaking is done again while excluding the corresponding potential lending offer.

On the other hand, no matchmaking is given by the matchmaking section 28 (S30), the potential borrowers and lenders are asked about participation in the next auction. If an intent to participate is confirmed, registration in the borrowing request file 42 or lending offer file 44 can be maintained (S32). Alternatively, when no matchmaking is given, registration for participation in the next auction may be automatically maintained.

Even when the matchmaking is given by the matchmaking section 28, and the matchmaking plan is declined by the potential borrower or lender (S35), the potential borrower or lender is asked about participation in the next auction, as described above. If an intent to participate is confirmed, registration in the borrowing request file 42 or lending offer file 44 can be maintained (S32). Alternatively, when the matchmaking plan is declined by the potential borrower or lender, registration for participation in the next auction may be automatically maintained, as described above.

A financial auction is managed in this way.

The host apparatus 20 of the financial auction system according to the embodiment shown in FIG. 1 or 5 can further comprise a time layout section 36 (time layout means), as shown in FIG. 1 or 5. The time layout section 36 combines a potential borrowing request and a potential lending offer such that the requested borrowing maturity of the potential borrowing request matches the offered lending maturity of the potential lending offer. This is performed in the matchmaking process in FIG. 2 or 6.

For example, as a simplest method, the requested borrowing maturity and offered lending maturity can be set in units of designated periods. With this processing, a potential lending offer can be divided to unit periods and offered to an auction. Matchmaking is easy when the offered lending maturity of the potential lending offer is regarded as a kind of screening condition. If necessary, the requested borrowing maturity and offered lending maturity may be set in units of days. For example, when a borrower wants to obtain a loan of ¥1,000,000 yen for a year, and two lenders can lend ¥1,000,000 yen for a half year, this financing offer can be established.

Third Embodiment

Figure 7:
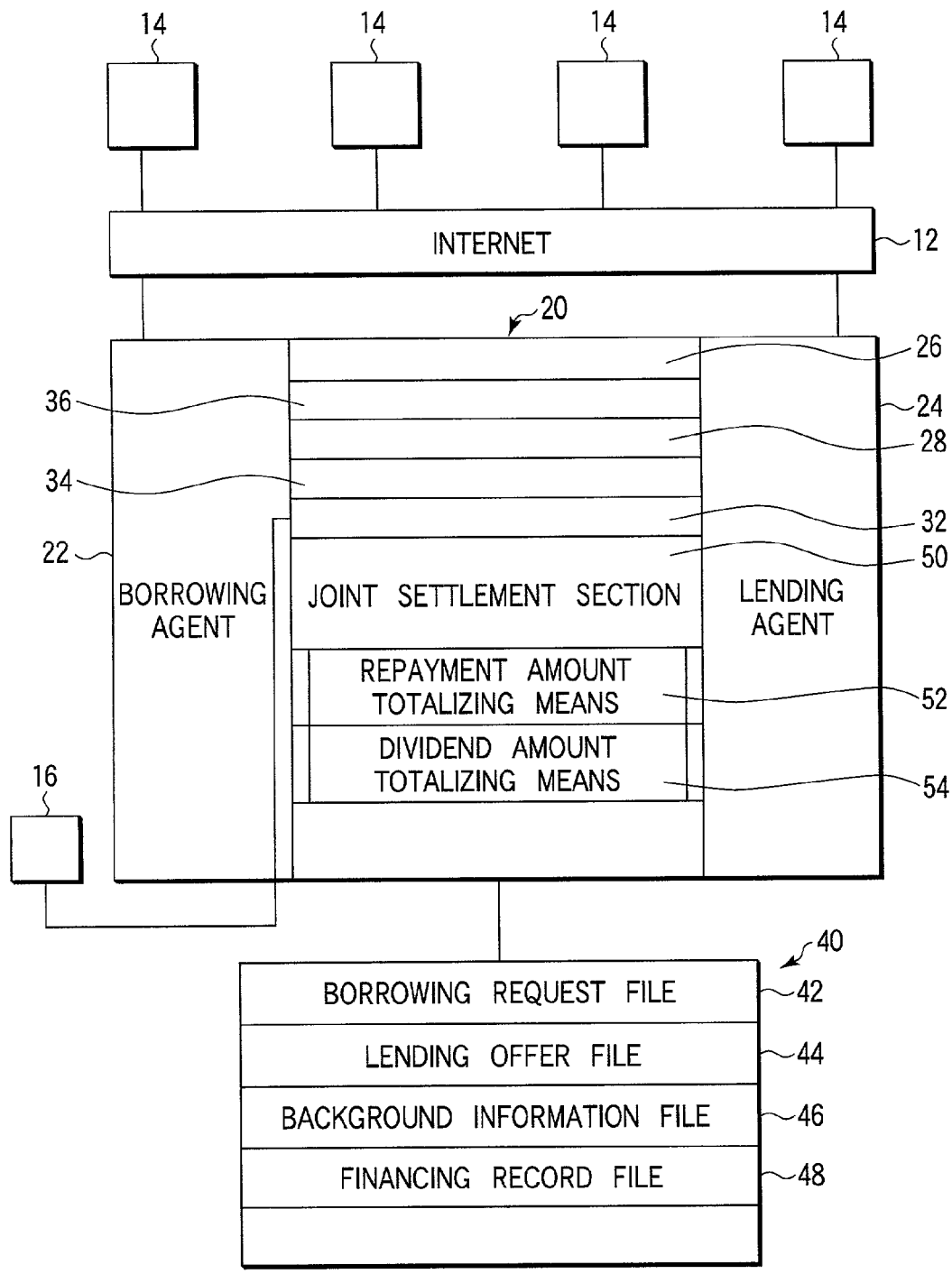
FIG. 7 is a block diagram showing a financial auction system according to still another embodiment of the present invention.

FIG. 7 is a block diagram showing a financial auction system according to still another embodiment of the present invention.

This embodiment is different from that shown in FIG. 5 in that a host apparatus 20 of a financial auction system further comprises a joint settlement section 50. In this case, a financing record file 48 which stores the borrowers, lenders, financing amounts, interests, and loan maturities of a plurality of made financing offers is formed in a database 40. As the arrangement of the host apparatus 20 shown in FIG. 7, the joint settlement section 50 is added to the arrangement shown in FIG. 5. However, the joint settlement section 50 may be added to the arrangement shown in FIG. 1.

The joint settlement section 50 comprises repayment amount totalizing means 52 for calculating the total repayment amount for each repayment maturity of a single borrower, and a dividend amount totalizing means 54 for calculating the total dividend amount for each divided period of a single lender. That is, in the joint settlement section 50, instead of defining the repayment amount as a divided amount in units of given financing offers (debts/credits) the repayments of a plurality of requests of a single borrower are totalized, and the dividends of a plurality of offers of a single lender are totalized.

FIG. 8 is a view showing the concept of joint repayment by two borrowers C1 and C2 and three lenders D1 to D3. The borrower C1 is involved in three financing offers C11 to C13, and the borrower C2 is involved in two financing offers C21 and C22. On the other hand, the lender D1 has a portfolio D11 related to the financing offers C11 and C21, the lender D2 has a portfolio D21 related to the financing offers C12 and C13, and the lender D3 has a portfolio D31 related to the financing offer C22. The borrowers C1 and C2 only need repay the total amount for each repayment maturity, and the lenders D1 to D3 can receive the total divided amount for each divided period. According to this joint repayment method, the flow of funds can be put together, the business routine can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An auction system including a computer disposed in a site accessible from user terminals through a transmission line of a network, the auction system comprising:

a selection section configured to select a borrowing request or a lending offer for each user;

an input section configured to input information related to the borrowing request and including a desired borrowing amount and a maximum allowable interest if a user selects the borrowing request, and to input information related to the lending offer and including a desired lending amount and a desired interest or a condition capable of calculating the desired interest if another user selects the lending offer;

a borrowing intermediacy section configured to receive a plurality of potential borrowing requests from user terminals corresponding to a plurality of users who selected the borrowing request;

a borrowing request storage section configured to register the potential borrowing requests input through the transmission line into the borrowing intermediacy section;

a lending intermediacy section configured to receive a plurality of potential lending offers from user terminals corresponding to a plurality of users who selected the lending offer;

a lending offer storage section configured to register the potential lending offers input through the transmission line into the lending intermediacy section;

a background information storage section configured to store background information of the potential borrowing requests;

a risk calculation section configured to calculate a risk of each of the potential borrowing requests and an appropriate interest rate thereof from the background information of the potential borrowing requests; and a matchmaking section configured to select a set of successful bids between the potential borrowing requests and the potential lending offers and output the set of successful bids, wherein the risk calculation section is configured to allow each of entities of the potential lending offers to designate a risk calculation condition used for a corresponding potential lending offer, and the risk calculation section calculates an appropriate interest rate for application to each of the potential borrowing requests while using background information of a corresponding potential borrowing request stored in the background information storage section, in accordance with a designated risk calculation condition for each of the potential lending offers, so as to allow a corresponding entity to refer to the appropriate interest rate, and the matchmaking section performs matchmaking between the potential borrowing requests registered in the borrowing request storage section and the potential lending offers registered in the lending offer storage section, by setting a certain order of priority on these potential borrowing requests, and selecting the set of successful bids, in descending order of priority of the potential borrowing requests and in ascending order of the desired interests of the potential lending offers, within a range not more than the maximum allowable interest of the potential borrowing requests, until the desired borrowing amount of the potential borrowing requests is satisfied.

2. The auction system according to claim 1, further comprising a section configured to allow an entity of a potential lending offer to read the background information of potential borrowing requests.

3. The auction system according to claim 1, wherein the background information of a potential borrowing request contains accounting information of an entity of the potential borrowing request, and the risk calculation section is configured to calculate a default rate of the entity of the potential borrowing request based on the accounting information.

4. The system according to claim 1, wherein each of the potential lending offers includes a maximum allowable risk, and the system further comprises a screening section configured to select a potential lending offer for which the risk calculated by the risk calculation section falls within a range of the maximum allowable risk from a corresponding potential lending offer.

5. The system according to claim 1, further comprising:
a repayment totalizing section configured to calculate a total repayment amount for each repayment maturity of a single borrower; and
a dividend calculation/totalizing section configured to calculate a total dividend amount formed from a total of interests and principals for each dividend period of a single lender.

6. The system according to claim 1, wherein the certain order of priority is set to give priority to a potential borrowing request with a higher maximum allowable interest concerning the desired borrowing amount.

* * * * *